(12) United States Patent
Okinaga et al.

(10) Patent No.: US 10,634,167 B2
(45) Date of Patent: Apr. 28, 2020

(54) CENTRIFUGAL BLOWER AND AUTOMOBILE PROVIDED WITH SAME

(71) Applicant: Panasonic Intellectual Property Management Co., Ltd., Osaka (JP)

(72) Inventors: Kinjirou Okinaga, Osaka (JP); Takatoshi Yoshida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 495 days.

(21) Appl. No.: 15/504,345

(22) PCT Filed: Oct. 8, 2015

(86) PCT No.: PCT/JP2015/005106
§ 371 (c)(1),
(2) Date: Feb. 16, 2017

(87) PCT Pub. No.: WO2016/059776
PCT Pub. Date: Apr. 21, 2016

(65) Prior Publication Data
US 2017/0261005 A1 Sep. 14, 2017

(30) Foreign Application Priority Data

Oct. 14, 2014 (JP) ................................. 2014-209575

(51) Int. Cl.
*F04D 29/66* (2006.01)
*F04D 25/06* (2006.01)
(Continued)

(52) U.S. Cl.
CPC ............... *F04D 29/66* (2013.01); *B60H 1/00* (2013.01); *F04D 13/06* (2013.01);
(Continued)

(58) Field of Classification Search
CPC ........ F04D 29/66; F04D 13/06; F04D 29/668; F04D 29/441; F04D 29/4226; F04D 25/0606; F04D 29/083; B60H 1/00
See application file for complete search history.

(56) References Cited

U.S. PATENT DOCUMENTS 5,639,228 A * 6/1997 Van De Venne ........ F04D 25/08
415/214.1
6,802,699 B2 * 10/2004 Mikami ............... F04D 29/4226
310/62
(Continued)

FOREIGN PATENT DOCUMENTS

| EP | 1688622 A2 | 8/2006 |
|---|---|---|
| JP | 3052507 B | 6/2000 |
| JP | 2004-353510 | 12/2004 |

OTHER PUBLICATIONS

The Extended European Search Report dated Sep. 4, 2017 for the related European Patent Application No. 15850692.3.
(Continued)

*Primary Examiner* — David Hamaoui
(74) *Attorney, Agent, or Firm* — McDermott Will & Emery LLP

(57) ABSTRACT

Blower case provided in centrifugal blower of the present invention has side wall, suction port, a discharge port, and flow channel. In flow channel, when impeller is rotated by rotation action transmitted from motor, air sucked from suction port and passed through an inner peripheral side end and outer peripheral side end is guided to the discharge port along side wall. A shape of a cross section of flow channel including rotational axis is wider, toward an opposite side where the suction port is located relative to a side where suction port is located in a direction along axial center direction, in a second cross section located near the dis-
(Continued)

charge port than in a first cross section located far from the discharge port in a direction in which impeller rotates.

5 Claims, 8 Drawing Sheets

(51) Int. Cl.
*F04D 29/44* (2006.01)
*B60H 1/00* (2006.01)
*F04D 29/08* (2006.01)
*F04D 29/42* (2006.01)
*F04D 13/06* (2006.01)

(52) U.S. Cl.
CPC ....... *F04D 25/0606* (2013.01); *F04D 29/083* (2013.01); *F04D 29/4226* (2013.01); *F04D 29/441* (2013.01); *F04D 29/668* (2013.01)

(56) References Cited

U.S. PATENT DOCUMENTS

| | | | | |
|---|---|---|---|---|
| 7,118,355 B2 * | 10/2006 | Lipa, III | ............ | F04D 25/0606 |
| | | | | 417/370 |
| 7,520,734 B2 * | 4/2009 | Luedtke | ................ | F04D 29/662 |
| | | | | 417/423.1 |
| 8,267,674 B2 * | 9/2012 | Czulak | .................. | F04D 29/584 |
| | | | | 417/370 |
| 10,451,080 B2 * | 10/2019 | Klink | ....................... | F04D 25/06 |
| 2016/0186763 A1 * | 6/2016 | Keber | .................. | F04D 29/083 |
| | | | | 417/423.12 |
| 2019/0055957 A1 * | 2/2019 | Nakatani | ............... | F04D 29/051 |

OTHER PUBLICATIONS

International Search Report of PCT application No. PCT/JP2015/005106 dated Jan. 12, 2016.

* cited by examiner

US 10,634,167 B2

CENTRIFUGAL BLOWER AND AUTOMOBILE PROVIDED WITH SAME

This application is a U.S. national stage application of the PCT international application PCT/JP2015/005106 filed on Oct. 8, 2015, which claims the benefit of foreign priority of Japanese patent application No. 2014-209575 filed on Oct. 14, 2014, the contents all of which are incorporated herein by reference.

TECHNICAL FIELD

The present invention relates to a centrifugal blower in which an elastic part serving as a seal member is located between a blower case and a motor.

BACKGROUND ART

Thinning of a centrifugal blower used for an automobile or the like is strongly requested in order to mount the centrifugal blower in a limited space of a vehicle body. In the following description, the centrifugal blower used for the automobile or the like is also simply referred to as a centrifugal blower.

Further, strong requests described below are made to the centrifugal blower. In other words, noise reduction is requested to the centrifugal blower so that a passenger does not hear unpleasant noise. A countermeasure for rigidity against vibration generated when an automobile travels is requested to the centrifugal blower. Preventing infiltration of water into the centrifugal blower or accumulation of water outside the centrifugal blower caused by submergence or the like is requested to the centrifugal blower.

Conventionally, the centrifugal blower has prevented deterioration of a motor of the centrifugal blower or occurrence of abnormality in a circuit of the motor due to infiltration of water or salt through a flow channel. For example, PTL 1 discloses provision of a rubber vibration isolator on a mounting plate included in a motor as a countermeasure against vibration or noise caused by the vibration. The motor disclosed in PTL 1 is fastened to a fan case. With this configuration, the motor disclosed in PTL 1 can suppress vibration and prevent foreign matter from entering through a flow channel.

Other than the above, PTL 2 discloses a configuration in which a motor is mounted on an inside of a hub included in an impeller.

CITATION LIST

Patent Literatures

PTL 1: Japanese Patent No. 3052507
PTL 2: Unexamined Japanese Patent Publication No. 2004-353510

SUMMARY

A centrifugal blower of the present invention is provided with an impeller, a motor, a blower case, and an elastic part.

The impeller has a hub and a plurality of blade plates. The hub includes a rotational axis in a center. The hub has a surface extending in a direction intersecting with the rotational axis. The plurality of blade plates extends in a direction along the rotational axis. Each of the plurality of blade plates includes an inner peripheral side end located on a rotational axis side and an outer peripheral side end located on an opposite rotational axis side.

The motor has a shaft and a motor case. The shaft has one side serving as an output axis and another side serving as an opposite output axis. The motor case includes a protrusion protruded toward a direction intersecting with the shaft and forms an outer frame. The motor transmits rotation action to the rotational axis via the shaft.

The blower case is configured to cover the impeller. The blower case has a side wall, a suction port, a plane surface, a discharge port, and a flow channel. The side wall is formed along the rotational axis. The suction port is located in a direction of an axial center included in the rotational axis. The plane surface is located opposite to the suction port. When the impeller is rotated by the rotation action transmitted from the motor, the discharge port opens toward a direction in which the impeller rotates. In the flow channel, when the impeller is rotated by the rotation action transmitted from the motor, air sucked from the suction port and passed through the inner peripheral side end and the outer peripheral side end is guided to the discharge port along the side wall. A shape of a cross section of the flow channel including the rotational axis is wider, toward an opposite side where the suction port is located relative to a side where the suction port is located in a direction along the direction of the axial center, in a second cross section located near the discharge port than in a first cross section located far from the discharge port in the direction in which the impeller rotates.

The elastic part surrounds an outer peripheral surface of the motor case on a surface intersecting with the rotational axis. The elastic part is located between the protrusion and the plane surface.

DESCRIPTION OF PREFERRED EMBODIMENTS

A centrifugal blower in exemplary embodiments of the present invention can obtain a large output and can be thinned by a configuration described below. Also, the centrifugal blower in the present exemplary embodiments can reduce noise, enhance efficiency, and improve reliability against submergence.

In brief, the conventional centrifugal blowers have the following points to be improved. In other words, the configuration disclosed in PTL 1 has difficulty of workability during mounting. Hence, the configuration disclosed in PTL 1 has poor productivity.

Further, since the motor includes the mounting plate in the centrifugal blower disclosed in PTL 1, an outer frame of the motor is raised. Hence, the centrifugal blower disclosed in PTL 1 is not suitable for thinning.

Moreover, in the centrifugal blower disclosed in PTL 1, in a case where a blower case is mounted on a housing, such as a vehicle body, rigidity of a motor case and the blower case is insufficient. Hence, the centrifugal blower disclosed in PTL 1 has a structure in which a resonance point is easily generated.

Further, in the configuration disclosed in PTL 2, a blower motor requires a hole for drawing out a cable of a power source or the like of the motor to outside of the centrifugal blower.

Further, the usable motor is limited to a small motor in the centrifugal blower disclosed in PTL 2.

Therefore, the centrifugal blower in the exemplary embodiments of the present invention is inexpensive and has high productivity. Further, the centrifugal blower in the present exemplary embodiments prevents foreign matter from entering inside the centrifugal blower via a flow channel. Further, the centrifugal blower in the present exemplary embodiments can improve quietness and reduce windage loss by preventing wind leakage. Hence, the centrifugal blower in the present exemplary embodiments increases an output, enhances efficiency, and has high reliability.

Hereinafter, the exemplary embodiments of the present invention are described with reference to the drawings. It should be noted that the following exemplary embodiments are embodied examples of the present invention and do not limit a technical scope of the present invention.

First Exemplary Embodiment

Figure 1:
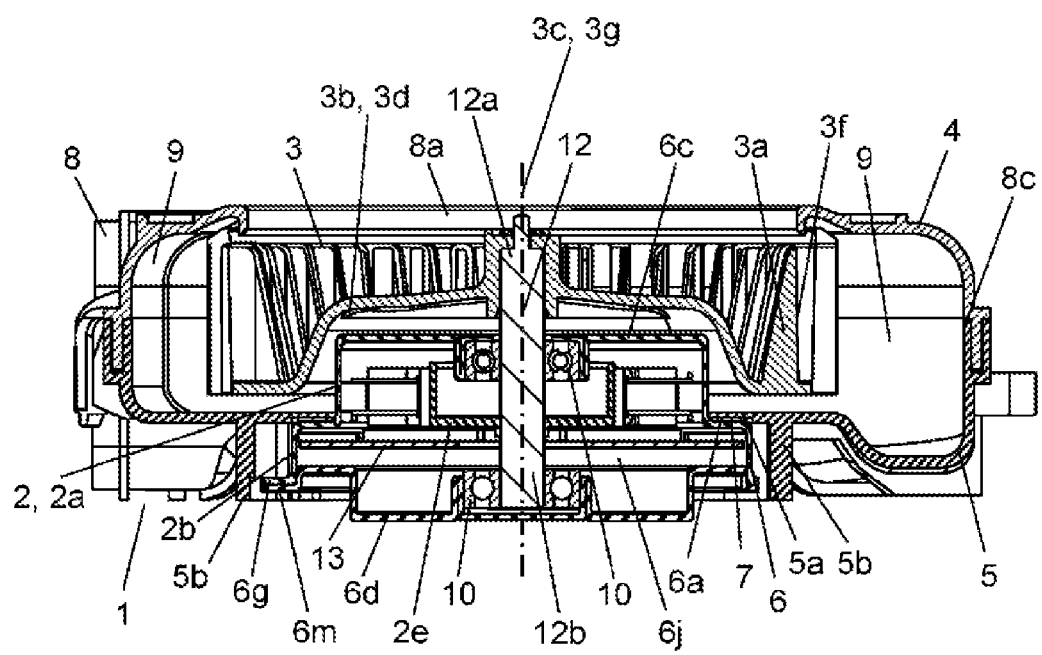
FIG. 1 is a sectional view of a centrifugal blower in a first exemplary embodiment of the present invention.
Figure 2:
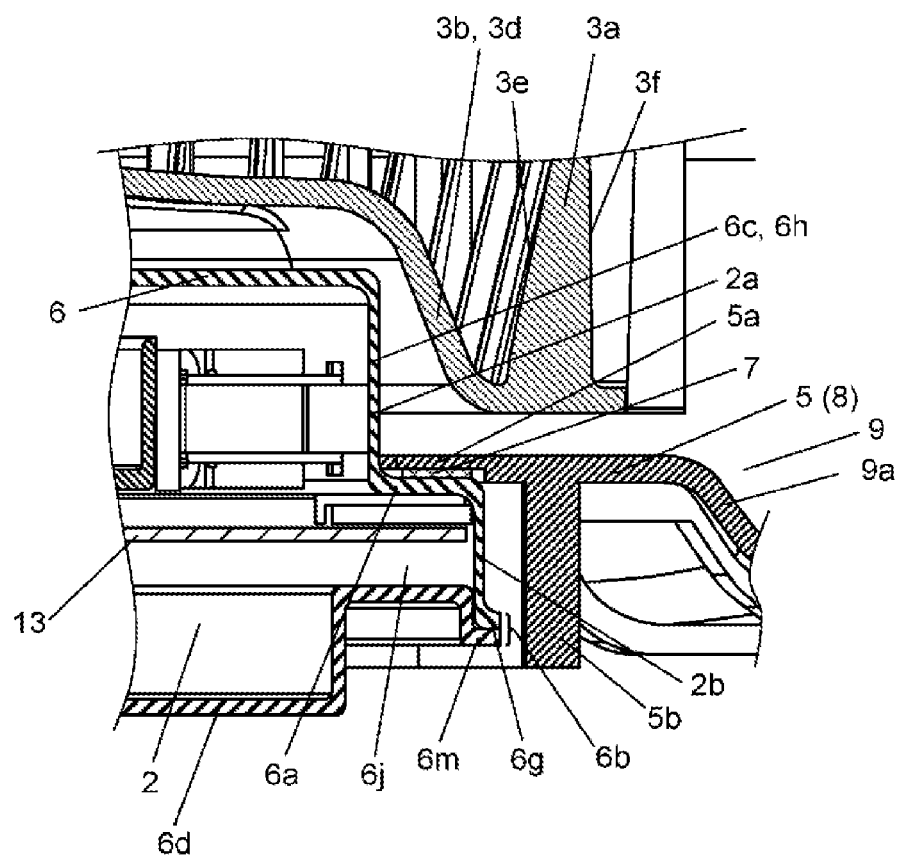
FIG. 2 is a sectional view of a main part of the centrifugal blower in the first exemplary embodiment of the present invention.
Figure 3:
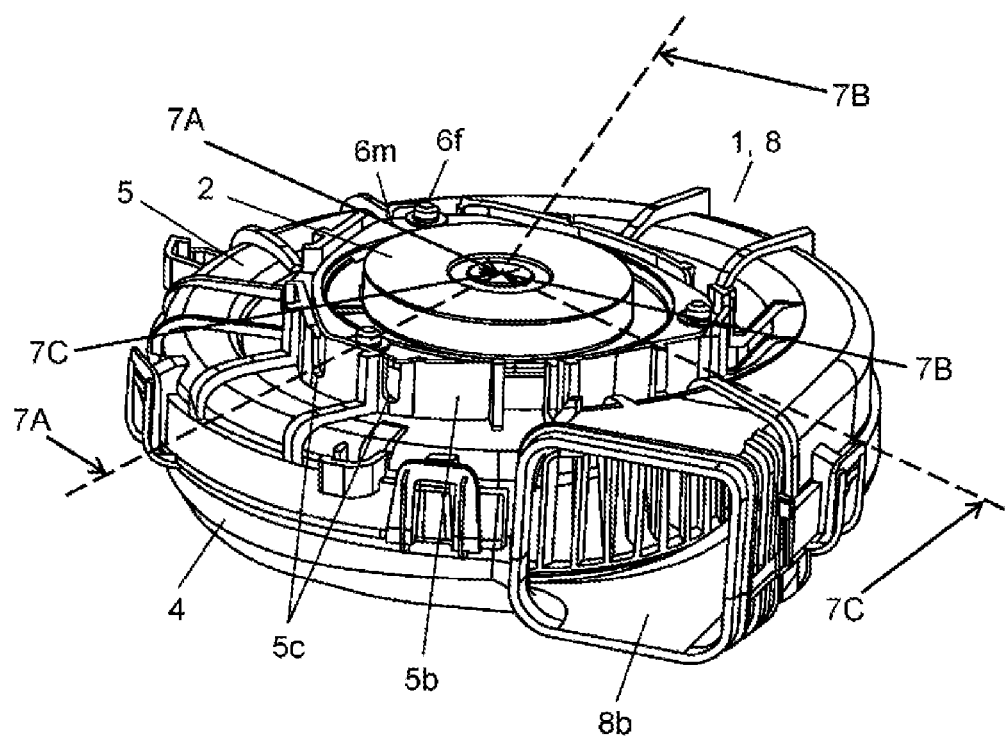
FIG. 3 is a perspective view of the centrifugal blower in the first exemplary embodiment of the present invention.
Figure 4:
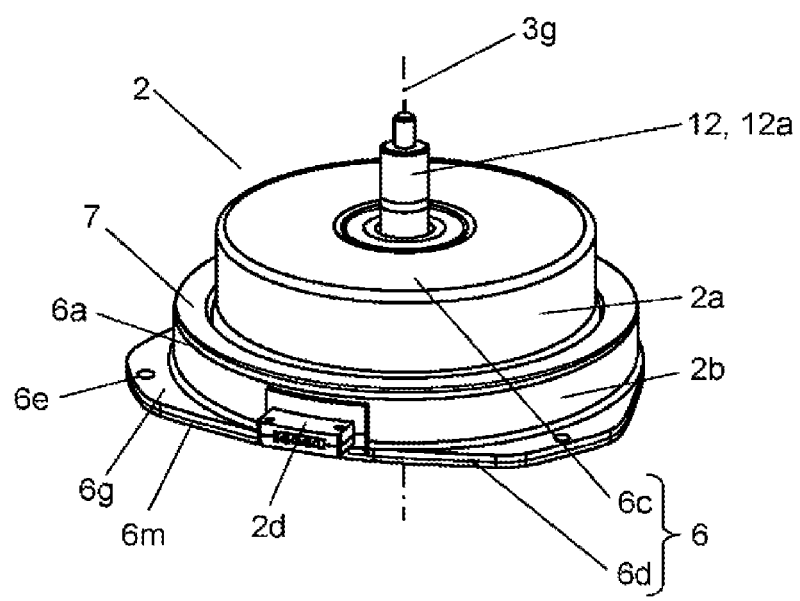
FIG. 4 is a perspective view of a motor provided in the centrifugal blower in the first exemplary embodiment of the present invention.
Figure 5A:
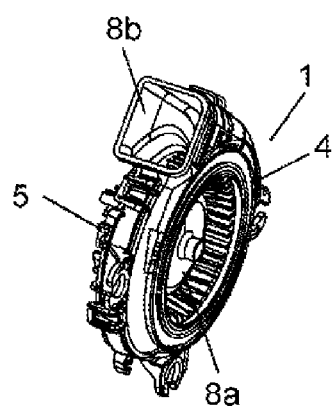
FIG. 5A is an assembled view of the centrifugal blower in the first exemplary embodiment of the present invention.
Figure 5B:
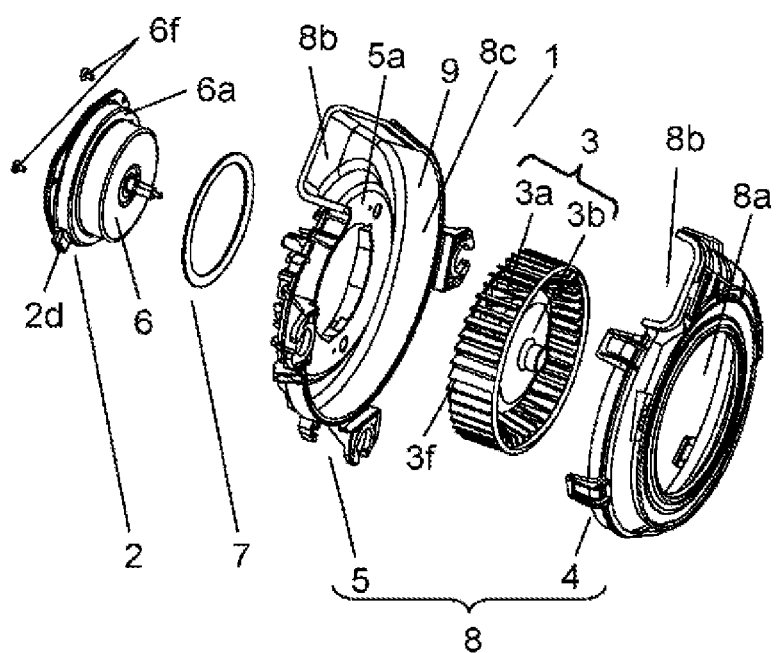
FIG. 5B is an exploded view of the centrifugal blower in the first exemplary embodiment of the present invention.

FIG. 1 is a sectional view of a centrifugal blower in a first exemplary embodiment of the present invention. FIG. 2 is a sectional view of a main part of the centrifugal blower in the first exemplary embodiment of the present invention. FIG. 3 is a perspective view of the centrifugal blower in the first exemplary embodiment of the present invention. FIG. 4 is a perspective view of a motor provided in the centrifugal blower in the first exemplary embodiment of the present invention. FIG. 5A is an assembled view of the centrifugal blower in the first exemplary embodiment of the present invention. FIG. 5B is an exploded view of the centrifugal blower in the first exemplary embodiment of the present invention.

Figure 5C:
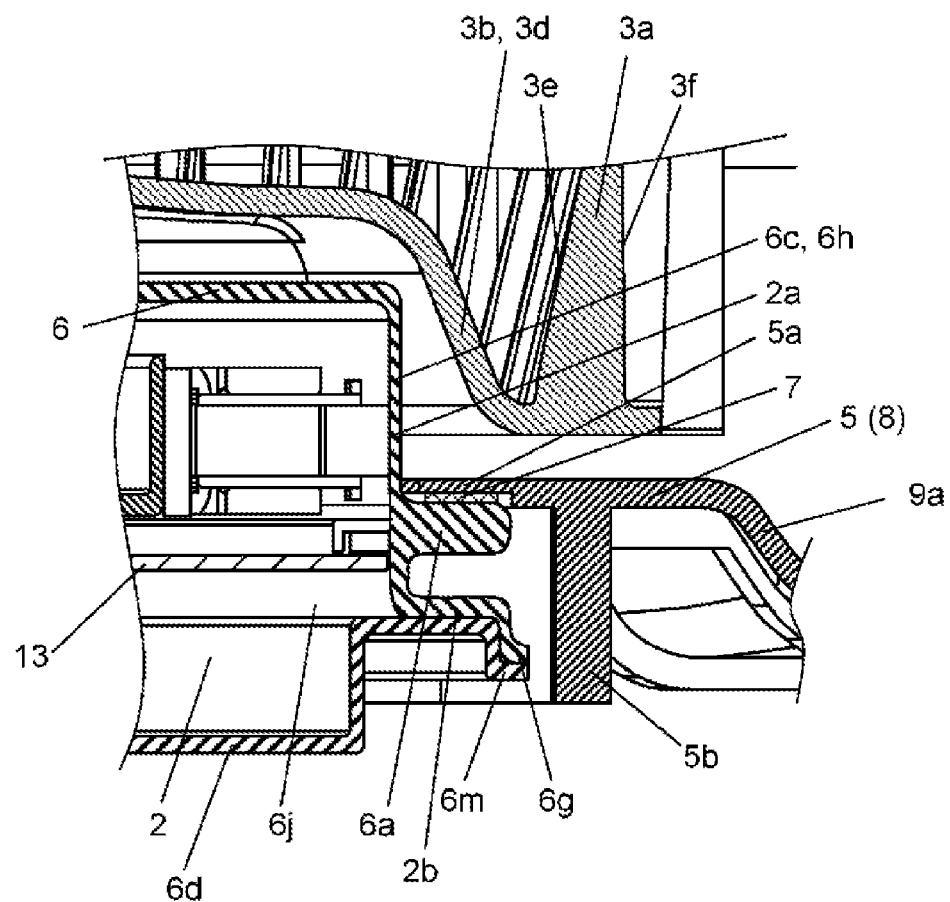
FIG. 5C is an enlarged view of another main part of the centrifugal blower in the first exemplary embodiment of the present invention.

Further, FIG. 5C is an enlarged view of another main part of the centrifugal blower in the first exemplary embodiment of the present invention.

Figure 6:
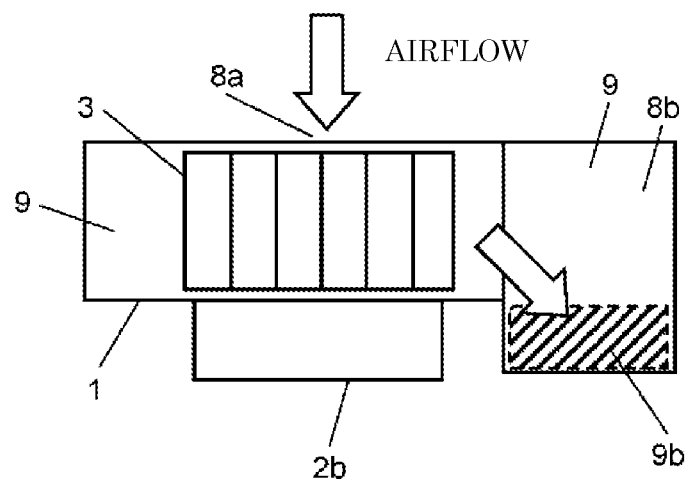
FIG. 6 is an explanatory diagram showing a stream of airflow generated by the centrifugal blower in the first exemplary embodiment of the present invention.
Figure 7A:
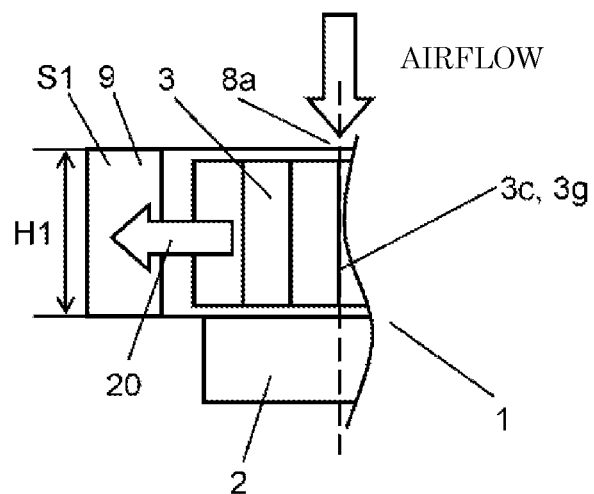
FIG. 7A is a conceptual diagram showing a cross section taken along line 7A-7A shown in FIG. 3.
Figure 7B:
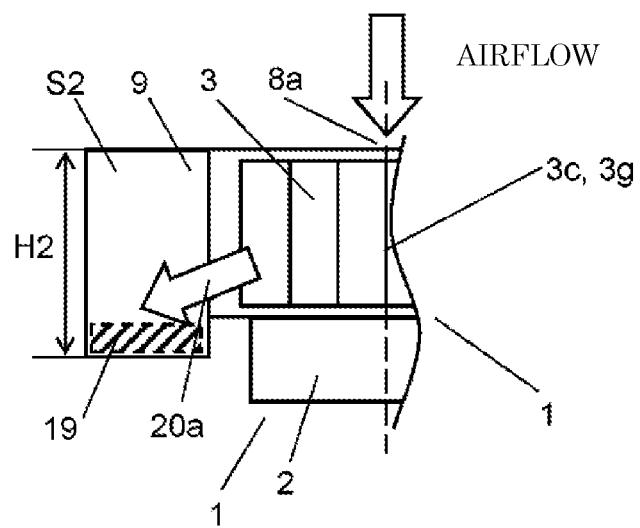
FIG. 7B is a conceptual diagram showing a cross section taken along line 7B-7B shown in FIG. 3.
Figure 7C:
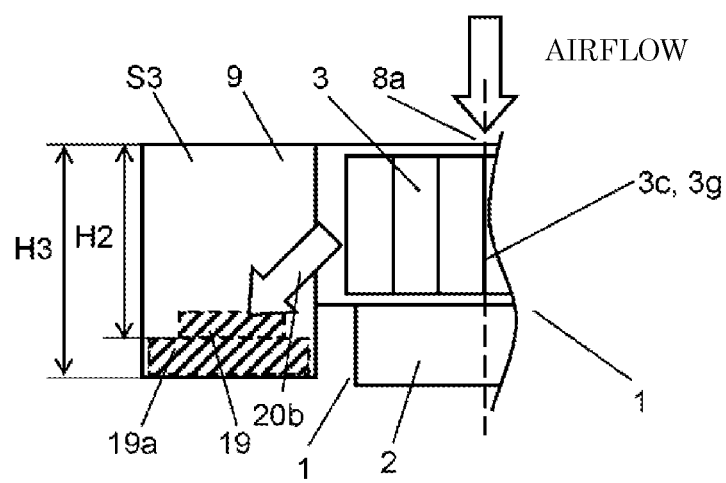
FIG. 7C is a conceptual diagram showing a cross section taken along line 7C-7C shown in FIG. 3.

Further, FIG. 6 is an explanatory diagram showing a stream of airflow generated by the centrifugal blower in the first exemplary embodiment of the present invention. FIG. 7A is a conceptual diagram showing a cross section taken along line 7A-7A shown in FIG. 3. FIG. 7B is a conceptual diagram showing a cross section taken along line 7B-7B shown in FIG. 3. FIG. 7C is a conceptual diagram showing a cross section taken along line 7C-7C shown in FIG. 3.

As shown in FIG. 1, centrifugal blower 1 in the first exemplary embodiment of the present invention is provided with impeller 3, motor 2, blower case 8, and elastic part 7.

Impeller 3 has hub 3b and blades 3a serving as a plurality of blade plates. Hub 3b includes rotational axis 3c in a center. Hub 3b has surface 3d extending in a direction intersecting with rotational axis 3c. Blades 3a serving as the plurality of blade plates extend in a direction along rotational axis 3c. As shown in FIG. 2, each of blades 3a serving as the plurality of blade plates includes inner peripheral side end 3e located on rotational axis (3c) side and outer peripheral side end 3f located on an opposite rotational axis side.

As shown in FIGS. 1 and 4, motor 2 has shaft 12 and motor case 6. One side of shaft 12 is output axis 12a, and another side of shaft 12 is opposite output axis 12b. Motor case 6 includes protrusion 6a protruded toward a direction intersecting with shaft 12 and forms an outer frame. Motor 2 transmits rotation action to rotational axis 3c via shaft 12.

As shown in FIGS. 1 to 3, blower case 8 is configured to cover impeller 3. Blower case 8 has side wall 8c, suction port 8a, plane surface 5a, discharge port 8b, and flow channel 9. Side wall 8c is formed along rotational axis 3c. Suction port 8a is located in a direction of axial center 3g included in rotational axis 3c. Plane surface 5a is located opposite to suction port 8a. When impeller 3 is rotated by the rotation action transmitted from motor 2, discharge port 8b opens in a direction in which impeller 3 rotates. In flow channel 9, when impeller 3 is rotated by the rotation action transmitted from motor 2, air suctioned from suction port 8a and passed through inner peripheral side end 3e and outer peripheral side end 3f is guided to discharge port 8b along side wall 8c. As described below, a shape of a cross section of flow channel 9 including rotational axis 3c is wider, toward an opposite side where suction port 8a is located relative to a side where suction port 8a is located in a direction along axial center 3g direction, in a second cross section located near discharge port 8b than in a first cross section located far from discharge port 8b in the direction in which impeller 3 rotates.

As shown in FIG. 2, elastic part 7 surrounds outer peripheral surface 6h of motor case 6 on a surface intersecting with rotational axis (3c). Elastic part 7 is located between protrusion 6a and plane surface 5a.

Particularly, a configuration exerting conspicuous effects is described below.

In other words, as shown in FIG. 4, motor case 6 of the centrifugal blower further includes output axis side case 2a and opposite output axis side case 2b. Output axis side case 2a is located closer on output axis 12a side of shaft 12 than protrusion 6a in axial center 3g direction, with protrusion 6a as a boundary. Opposite output axis side case 2b is located closer on opposite output axis (12b) side of shaft 12 than protrusion 6a in axial center 3g direction, with protrusion 6a as the boundary.

As shown in FIG. 2, hub 3b is formed so as to cover output axis side case 2a.

As shown in FIG. 1, the shape of the cross section of flow channel 9 including rotational axis 3c widens from the surface intersecting with axial center 3g including protrusion 6a toward opposite output axis 12b side in axial center 3g direction.

Further, as shown in FIG. 2, hub 3b has a shape protruded toward output axis (12a) side in axial center 3g direction. Hub 3b is formed so as to cover output axis side case 2a.

Flow channel 9 includes guide 9a. Guide 9a guides air flowed out from hub 3b to a portion covering opposite output axis side case 2b along an extension of the protruded shape fluidically.

Further, as shown in FIGS. 1 and 2, motor 2 of centrifugal blower 1 includes drive circuit 13 inside motor case 6. Motor 2 is an inner rotor type brushless motor.

Further, as shown in FIG. 1, blower case 8 of centrifugal blower 1 is further divided into upper case 4 including suction port 8a and lower case 5 including plane surface 5a, in axial center 3g direction.

Further, as shown in FIGS. 1, 2, and 4, motor case 6 of centrifugal blower 1 further has cylinder 6c and lid 6d. Cylinder 6c is located on output axis 12a side in axial center 3g direction. Cylinder 6c includes opening 6j and first flange 6g. Opening 6j opens on one side in axial center 3g direction. In opening 6j, first flange 6g protrudes in a direction intersecting with axial center 3g direction. Lid 6d is located on opposite output axis 12b side and mounted so as to cover opening 6j in axial center 3g direction. Lid 6d includes second flange 6m formed relative to first flange 6g.

As shown in FIGS. 1 to 3, blower case 8 further includes rib 5b. Rib 5b extends in the direction along axial center 3g direction on a surface where plane surface 5a is in contact with elastic part 7. When motor case 6 is mounted on blower case 8 via elastic part 7, rib 5b has a height covering a portion where first flange (6g) and second flange 6m are in contact with each other.

Particularly, as shown in FIG. 3, rib 5b further includes grooves 5c recessed along axial center (3g) direction.

Detailed description is further given with reference to the drawings.

As shown in FIG. 5B, centrifugal blower 1 is provided with motor 2, impeller 3, upper case 4, lower case 5, and elastic part 7. Motor 2 has motor case 6 formed of metal. Motor case 6 includes protrusion 6a. Here, as shown in FIG. 2, protrusion 6a can be formed by bending motor case 6. Further, as shown in FIG. 5C, protrusion 6a can be also formed at a projection projecting in an outer peripheral direction of motor 2 on outer peripheral surface 6h of motor case 6. It should be noted that, in the first exemplary embodiment, protrusion 6a is described by using the protrusion formed by bending motor case 6.

As shown in FIG. 5B, impeller 3 is formed with the plurality of blades 3a and hub 3b mounted with the plurality of blades 3a. Motor 2 rotates impeller 3. Impeller 3 is housed in blower case 8. Blower case 8 is configured by fitting upper case 4 and lower case 5 to each other. Suction port 8a is included in upper case 4. As shown in FIG. 5A, discharge port 8b is formed when upper case 4 and lower case 5 are fitted to each other.

In centrifugal blower 1, air sucked from suction port 8a is blown out from outer peripheral side end 3f side of blades 3a via blades 3a included in impeller 3. The air blown out from impeller 3 is discharged from discharge port 8b through flow channel 9 formed in blower case 8. Flow channel 9 is formed along side wall 8c of blower case 8. Flow channel 9 is formed in a spiral so as to surround an outer periphery of impeller 3.

In FIG. 1, flow channel 9 located on a left side inside centrifugal blower 1 has a small sectional area. A sectional height of flow channel 9 located on the left side is substantially the same as a height of impeller 3 in axial center 3g direction. On the other hand, flow channel 9 located on a right side inside centrifugal blower 1 has a large sectional area. A sectional height of flow channel 9 is greater than the height of impeller 3 in axial center 3g direction. The sectional height of flow channel 9 located on the right side is substantially the same as a height of discharge port 8b. In other words, the sectional area of flow channel 9 is larger toward discharge port 8b. The sectional area of flow channel 9 is larger as a height of flow channel 9 in axial center 3g direction is greater.

This reason is described with reference to FIG. 6. As shown in FIG. 6, the air sucked from suction port 8a is blown out from discharge port 8b expanded along a direction in which the air is sucked. At this time, the air sucked from suction port 8a flows into expansion part 9b expanded along the direction in which the air is sucked. Hence, the sucked air has small angular variations of airflow. Therefore, windage loss accompanied by the angular variations of airflow can be suppressed by the sucked air. As a result, discharge efficiency of centrifugal blower 1 in the first exemplary embodiment relative to a motor output becomes high.

As shown in FIG. 1, hub 3b of impeller 3 has a shape protruded toward suction port 8a. In the first exemplary embodiment, output axis side case 2a of motor 2 is housed in a hollow of hub 3b. Hence, a height of centrifugal blower 1 in axial center 3g direction can be suppressed by housing output axis side case 2a in hub 3b.

On the other hand, the height of the discharge port in axial center 3g direction is extended to a vicinity of an opposite output axis side end of opposite output axis side case 2b included in motor 2.

In the configuration of centrifugal blower 1, motor 2 is mounted on blower case 8. As mentioned above, the height of centrifugal blower 1 can be slightly lowered by devising a shape of hub 3b. However, it is difficult to absorb a height dimension of motor 2 by hub 3b. Therefore, in centrifugal blower 1 in the first exemplary embodiment, the height of flow channel 9 is extended to a height of opposite output axis side case 2b of motor 2 in axial center 3g direction.

With the present configuration, flow channel 9 for obtaining desired airflow can be secured while suppressing the height of centrifugal blower 1.

Moreover, description is given with reference to FIGS. 3 and 7A to 7C.

FIGS. 7A to 7C show conceptual diagrams of cross sections taken along lines 7A-7A, 7B-7B, 7C-7C, respectively, in FIG. 3.

First, description is given with reference to FIGS. 3, 7A, and 7B.

FIG. 7A shows cross section S1 of flow channel 9 serving as a first cross section in a cross section including rotational axis 3c. FIG. 7B shows cross section S2 of flow channel 9 serving as a second cross section in the cross section including rotational axis 3c. Cross section S1 serving as the first cross section is located far from discharge port 8b in the direction in which impeller 3 rotates. Cross section S2 serving as the second cross section is located closer to discharge port 8b than the first cross section. In a direction along axial center 3g direction, cross section S2 is wider than cross section S1 toward an opposite side where suction port 8a is located relative to a side where suction port 8a is located.

Specifically, a height of cross section S1 is indicated as H1 in axial center 3g direction. Similarly, a height of cross section S2 is indicated as H2 in axial center 3g direction. Since height H2 is greater than height H1, inside flow channel 9, cross section S2 has flow channel 19 expanded toward the opposite side where suction port 8a is located relative to the side where suction port 8a is located.

Next, description is given with reference to FIGS. 3, 7B, and 7C.

FIG. 7B shows cross section S2 of flow channel 9 serving as a first cross section in the cross section including rotational axis 3c. FIG. 7C shows cross section S3 of flow channel 9 serving as a second cross section in the cross section including rotational axis 3c. Cross section S2 serving as the first cross section is located far from discharge port 8b in the direction in which impeller 3 rotates. Cross section S3 serving as the second cross section is located closer to discharge port 8b than the first cross section. In the direction along axial center 3g direction, cross section S3 is wider than cross section S2 toward the opposite side where suction port 8a is located relative to the side where suction port 8a is located.

Specifically, the height of cross section S2 is indicated as H2 in axial center 3g direction. Similarly, a height of cross section S3 is indicated as H3 in axial center 3g direction. Since height H3 is greater than height H2, inside flow channel 9, cross section S3 has flow channel 19a expanded toward the opposite side where suction port 8a is located than the side where suction port 8a is located.

As shown in FIGS. 7A to 7C, air flowed into centrifugal blower 1 via suction port 8a is guided to flow channel 9 via impeller 3. At this time, as the height of flow channel 9 in axial center 3g direction is greater, streams of airflow 20, 20a, 20b guided from impeller 3 to flow channel 9 have shallower switchable angles generated in the direction of airflow. Hence, windage loss accompanied by the angular variations of airflow can be suppressed by the air sucked into centrifugal blower 1.

Particularly, as shown in FIGS. 1 and 2, when flow channel 9 is formed so as to include guide 9a, the windage loss is suppressed even more. In other words, flow channel 9 further includes guide 9a. Guide 9a has a shape of guiding the air flowed out from hub 3b to the portion covering opposite output axis side case 2b along the extension of the protruded shape fluidically.

Hence, centrifugal blower 1 can obtain a large output while realizing thinning by an appropriate combination of a shape of blower case 8 and a shape of motor case 6.

As shown in FIGS. 1 and 2, plane surface 5a is formed at a position opposite to suction port 8a in blower case 8. Further, cylinder 6c is bent and protrusion 6a is formed in motor 2. A surface of protrusion 6a located on suction port 8a side is a flat surface in axial center 3g direction. Protrusion 6a and plane surface 5a are mounted via elastic part 7. Since elastic part 7 has elastic force, protrusion 6a, elastic part 7, and plane surface 5a can be closely fitted together. Hence, foreign matter can be prevented from entering into blower case 8 from plane surface 5a side. It should be noted that foamed seal sponge material can be used for elastic part 7. A compressibility of the seal sponge material which can be used ranges from 20% to 50%. The seal sponge material can effectively prevent the compressed air in this range.

As shown in FIG. 1, in the first exemplary embodiment, motor 2 built in centrifugal blower 1 is the inner rotor type brushless motor. Hence, motor 2 can hollow rotor 2e. Moreover, motor 2 can insert bearing 10, which supports shaft 12, into rotor 2e. Therefore, motor 2 can achieve thinning of the motor itself.

Further, as shown in FIG. 4, motor case 6 is configured with cylinder 6c located on output axis 12a side of shaft 12 and lid 6d on opposite output axis (12b) side of shaft 12. Cylinder 6c is formed with first flange 6g. Lid 6d is formed with second flange 6m. Lid 6d is fitted into opening (6j) included in cylinder 6c.

As shown in FIGS. 3 to 5B, respective flanges 6g, 6m protrude on a side surface of motor case 6. Screws 6f are inserted into screw holes 6e included in respective flanges 6g, 6m. Motor case 6 is fixed by screws 6f.

FIG. 3 shows centrifugal blower 1 seen from motor 2 side.

Here, as shown in FIG. 3, motor 2 and lower case 5 are fixed by screws 6f. In other words, screws 6f pass through screw holes 6e included in respective flanges (6g) 6m. Screws 6f also pass through screw holes formed at lower case 5. Hence, motor 2 and lower case 5 are fixed by screws 6f.

Further, rib 5b is formed at lower case 5 so as to surround motor 2.

When rib 5b is formed, rigidity of a portion of lower case 5 mounted with motor 2 is increased. Hence, since natural vibration frequency of lower case 5 is increased, vibration caused by driving of motor 2 can be reduced.

Further, as shown in FIG. 2, when rib 5b is formed, it is possible to reduce a risk that fracture surface 6b of motor case 6 damages a component mounted around centrifugal blower 1. Further, forming rib 5b can prevent an operator from getting injured at the time of mounting centrifugal blower 1. Hence, safety of centrifugal blower 1 is enhanced.

Moreover, as shown in FIG. 3, rib 5b is formed with grooves 5c. With the present configuration, the following effects are exerted. In other words, centrifugal blower 1 can be mounted while motor 2 is located on an upper side and suction port (8a) is located on a lower side. In a case where centrifugal blower 1 is used in such a state, centrifugal blower 1 can be splashed with water. At this time, the water splashed onto centrifugal blower 1 is removed via grooves 5c.

Hence, the water splashed onto centrifugal blower 1 can be prevented from infiltrating into motor 2. Therefore, with the present configuration, it is no longer necessary to regulate a direction in which centrifugal blower 1 is mounted. Hence, application of centrifugal blower 1 is broadened.

Further, as shown in FIG. 5B, blower case 8 is divided at a position at which the height of impeller 3 is divided into two. Blower case 8 is configured with upper case 4 including suction port 8a and lower case 5 including plane surface 5a.

With the present configuration, when blower case 8 is assembled, impeller 3 and motor 2 can be easily and reliably mounted. Hence, assemblability of centrifugal blower 1 is improved. Further, in each operation, centrifugal blower 1 can be assembled while confirming waterproof property or sealing performance of each part.

Further, as shown in FIGS. 4 and 5B, connector 2d of motor 2 protrudes to outside of lower case 5. Hence, there is no need to make a hole in blower case 8 to perform wiring of motor 2. Therefore, sealing property of centrifugal blower 1 is secured.

As shown in FIG. 4, motor 2 has motor case 6 including protrusion 6a. A portion of motor 2 located closer on output axis 12a side than protrusion 6a included in motor case 6 is output axis side case 2a. Similarly, a portion of motor 2 located closer on opposite output axis (12b) side than protrusion 6a included in motor case 6 is opposite output axis side case 2b. A stator or the like, around which a winding wire is wound, is housed inside output axis side case 2a. Drive circuit (13) for driving the motor is housed inside opposite output axis side case 2b. An outer diameter of opposite output axis side case 2b is larger than an outer diameter of output axis side case 2a. When motor 2 is mounted on blower case 8, output axis side case 2a also acts as a positioning part. Elastic part 7 is located between blower case 8 and protrusion 6a included in motor case 6.

When an inner diameter of elastic part 7 is larger than the outer diameter of output axis side case 2a and an outer diameter of elastic part 7 is smaller than the outer diameter of opposite output axis side case 2b, workability at the time of mounting motor 2 on lower case 5 is excellent. When the inner diameter of elastic part 7 is slightly larger than the outer diameter of output axis side case 2a, elastic part 7 is not moved unnecessarily.

Hence, when motor 2 and blower case 8 are assembled, positioning using a facility, a jig, or the like for assembling is not required. Therefore, assemblability of the centrifugal blower is improved. The improvement of assemblability contributes to cost reduction.

As it is obvious from the above description, the following effects are obtained by using the centrifugal blower in the present exemplary embodiment.

In other words, the centrifugal blower in the present exemplary embodiment can prevent wind leakage from the flow channel.

Further, the centrifugal blower in the present exemplary embodiment can prevent infiltration of water from the outside of the centrifugal blower to the inside of the centrifugal blower.

Further, since the centrifugal blower in the present exemplary embodiment can suppress vibration, the centrifugal blower has high quietness.

Further, the centrifugal blower in the present exemplary embodiment also has high productivity.

Moreover, since the centrifugal blower in the present exemplary embodiment includes the rib, rigidity is high and quietness is also high. Also, since the fracture surface included in the centrifugal blower in the present exemplary embodiment is surrounded by the rib, the fracture surface can be prevented from damaging the component located around the fracture surface. Further, since the fracture surface included in the centrifugal blower in the present exemplary embodiment is surrounded by the rib, an operator can be prevented from getting injured at the time of assembling the centrifugal blower. Hence, the centrifugal blower in the present exemplary embodiment is high in safety.

Second Exemplary Embodiment

Figure 8:
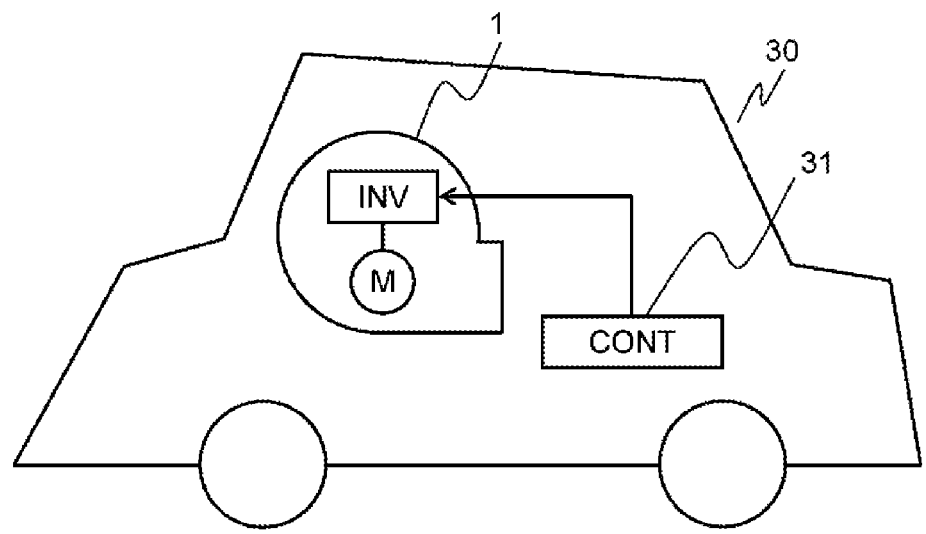
FIG. 8 is a conceptual diagram of an automobile in a second exemplary embodiment of the present invention.

FIG. 8 is a conceptual diagram of an automobile in a second exemplary embodiment of the present invention.

It should be noted that configurations similar to the configurations of the centrifugal blower in the first exemplary embodiment are described by assigning the same reference marks to the configurations in the second exemplary embodiment.

As shown in FIG. 8, automobile 30 in the second exemplary embodiment of the present invention is provided with centrifugal blower 1 described in the first exemplary embodiment and drive 31 for driving centrifugal blower 1.

With the present configuration, as mentioned above, centrifugal blower 1 having high rigidity can be used in automobile 30 in the second exemplary embodiment. Further, automobile 30 in the second exemplary embodiment can show effects obtained by centrifugal blower 1 described in the aforementioned first exemplary embodiment.

INDUSTRIAL APPLICABILITY

A centrifugal blower in the present invention prevents infiltration of water into the centrifugal blower, and exhibits excellent performance against vibration or noise. Further, the centrifugal blower in the present invention is high in safety. Hence, the centrifugal blower in the present invention is particularly suitable for a blower for an automobile which requires high performance on safety, low vibration, and noise reduction.

The invention claimed is:

1. A centrifugal blower comprising:
    an impeller having:
        a hub which includes a rotational axis in a center and which has a surface extending in a direction intersecting with the rotational axis, and
        a plurality of blade plates which extends in a direction along the rotational axis and each of which includes:
            an inner peripheral side end, and
            an outer peripheral side end;
    a motor having:
        a shaft which has one side serving as an output axis and another side serving as an opposite output axis, and
        a motor case which includes a protrusion protruded toward a direction intersecting with the shaft and which forms an outer frame, and
    the motor transmitting rotation action to the rotational axis via the shaft;
    a blower case configured to cover the impeller and having:
        a side wall,
        a suction port located in a direction of an axial center included in the rotational axis,
        a plane surface located opposite to the suction port,
        a discharge port which opens toward a direction in which the impeller rotates, when the impeller is rotated by the rotation action transmitted from the motor, and
        a flow channel in which air sucked from the suction port and passed through the inner peripheral side end and the outer peripheral side end is guided to the discharge port along the side wall when the impeller is rotated by the rotation action transmitted from the motor, and which increases in cross-sectional area in the downstream direction by increasing in both thickness and height directions; and
    an elastic part surrounding an outer peripheral surface of the motor case and located between the protrusion of the motor case and the plane surface of the blower case,
    wherein the motor case includes an output axis side case and an opposite output axis side case constituting the protrusion, the output axis side case being disposed closer to the output axis than the opposite output axis side case,
    an outer diameter of the output axis side case is smaller than an outer diameter of the opposite output axis side case,
    an outer diameter of the opposite output axis side case is smaller than a diameter of the impeller, and
    an outer diameter of the elastic part is smaller than the outer diameter of the opposite output axis side case,
    wherein
    the motor case further has:
        a cylinder located on the side of the output axis in the direction of the axial center and including:
            an opening opened on one side of the direction of the axial center, and
            a first flange protruding toward a direction intersecting with the direction of the axial center in the opening, and
        a lid located on the side of the opposite output axis and mounted so as to cover the opening in the direction of the axial center, and includes a second flange formed relative to the first flange, the blower case further includes a rib which extends along the direction of the axial center on a surface where the plane surface is in contact with the elastic part, and when the motor case is mounted on the blower case via the elastic part, the rib has a height covering a portion where the first flange and the second flange are in contact with each other, and the rib further includes grooves recessed along the direction of the axial center.

2. The centrifugal blower according to claim 1, wherein the hub is formed so as to cover the output axis side case in a shape protruded toward the side of the output axis in the direction of the axial center, and the flow channel further includes a guide for guiding air flowed out from the hub, to a portion covering the opposite output axis side case along an extension of the protruded shape fluidically.

3. The centrifugal blower according to claim 1, wherein the motor is an inner rotor type brushless motor including a drive circuit inside the motor case.

4. The centrifugal blower according to claim 1, wherein the blower case is further divided into, in the direction of the axial center, an upper case including the suction port, and a lower case including the plane surface.

5. An automobile comprising:

the centrifugal blower according to claim 1; and a drive for driving the centrifugal blower.

* * * * *